(12) United States Patent
Wilson et al.

(10) Patent No.: US 8,036,942 B2
(45) Date of Patent: Oct. 11, 2011

(54) ECOMMERCE MARKETPLACE INTEGRATION TECHNIQUES

(75) Inventors: Adam D. Wilson, Seattle, WA (US); Bogdan Moldoveanu, Bothell, WA (US); Sandeep Nain, Seattle, WA (US); Matthew G. Humphrey, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 12/362,493

(22) Filed: Jan. 30, 2009

(65) Prior Publication Data

US 2010/0198641 A1 Aug. 5, 2010

(51) Int. Cl.
*G06Q 30/00* (2006.01)
(52) U.S. Cl. .................. 705/26; 705/8; 705/31; 705/14; 705/27; 709/223; 707/104.1
(58) Field of Classification Search ................ 705/8, 26, 705/31, 27
See application file for complete search history.

(56) References Cited

U.S. PATENT DOCUMENTS

| | | | |
|---|---|---|---|
| 7,698,174 B2 * | 4/2010 | Brunswig et al. | 705/27 |
| 7,711,603 B2 * | 5/2010 | Vanker et al. | 705/24 |
| 7,805,706 B1 * | 9/2010 | Ly et al. | 717/121 |
| 2002/0152133 A1 | 10/2002 | King et al. | |
| 2006/0029093 A1 * | 2/2006 | Van Rossum | 370/432 |
| 2006/0085336 A1 | 4/2006 | Seubert et al. | |
| 2008/0015958 A1 * | 1/2008 | Vanker et al. | 705/28 |
| 2008/0027830 A1 | 1/2008 | Johnson et al. | |
| 2008/0126225 A1 | 5/2008 | Briggs et al. | |
| 2008/0270250 A1 * | 10/2008 | Bolivar et al. | 705/26 |
| 2009/0265255 A1 * | 10/2009 | Jackson et al. | 705/27 |

OTHER PUBLICATIONS

Bergamaschi, et al. "A Data Integration Framework for E-commerce Product Classification", Retrieved at<<http://citeseerx.ist.psu.edu/viewdoc/summary?doi=10.1.1.7.6082>>, Bologna, Italy, pp. 15.
Fensel, et al."A Two-Layered Integration Approach for Product Information in B2B E-commerce", Retrieved at<<http://www.cs.vu.nl/~borys/papers/EC-Web01.pdf>>, In: Proceedings of the Second International Conference on Electronic Commerce and Web Technologies (EC WEB-2001), Munich, Germany, Sep. 4-6, 2001, © Springer-Verlag (to appear), pp. 14.
Yu, et al."A Dynamic Framework for e-Commerce Portals", Retrieved at<<http://paper.ijcsns.org/07_book/200603/200603C09.pdf>>, IJCSNS International Journal of Computer Science and Network Security, vol. 6 No. 3B, Mar. 2006, pp. 193-198.
"Microsoft Solution for Supplier Enablement Introduction", Retrieved at<<http://msdn.microsoft.com/en-us/library/ms978336.aspx>>, May 1, 2002, pp. 19.

* cited by examiner

*Primary Examiner* — Vanel Frenel

(57) ABSTRACT

Various technologies and techniques are disclosed for integrating ecommerce marketplaces. An ecommerce integration framework has definitions for common data entities that are commonly used by multiple ecommerce marketplaces for listing items. Definitions for common operations that can manipulate the common data entities are provided. An application programming interface is provided that uses the common data entities and common operations to enable enterprise resource planning systems to exchange data in a standardized format with ecommerce marketplaces. Catalogs of items to be sold in ecommerce marketplaces can be created and managed using a customizable structure. The customizable structure enables catalogs to be created in a hierarchical manner with at least one parent catalog and zero or more child catalogs. Data values specified in a respective child catalog override data values specified in the parent catalog. A method for communicating with a particular ecommerce marketplace using an ecommerce integration framework is described.

20 Claims, 6 Drawing Sheets

ECOMMERCE MARKETPLACE INTEGRATION TECHNIQUES

BACKGROUND

There are various ways to sell goods and services over the Internet. For example, a company can list products and/or services for sale on its own web site. The company can also list products and services for sale on one or more ecommerce marketplaces, such as Amazon.com or eBay. The process of creating and managing listings on each of these marketplaces differs among all of the marketplaces. Thus, companies have to keep track of the various data fields and formats expected by each ecommerce marketplace on which they list their products and services.

SUMMARY

Various technologies and techniques are disclosed for integrating ecommerce marketplaces. An ecommerce integration framework is described that has definitions for common data entities that are commonly used by multiple ecommerce marketplaces for listing items, and definitions for common operations that can manipulate the common data entities. An application programming interface uses the common data entities and the common operations to enable one or more enterprise resource planning systems to exchange data in a standardized format with the ecommerce marketplaces.

In one implementation, catalogs of items to be sold in one or more ecommerce marketplaces can be created and managed using a customizable structure. The customizable structure enables the catalogs to be created in a hierarchical manner with at least one parent catalog and zero or more child catalogs. Data values specified in a respective child catalog will override data values specified in the parent catalog.

In another implementation, a method for communicating with a particular ecommerce marketplace using a standard ecommerce integration framework is described. One or more connectors are implemented to communicate with a particular ecommerce marketplace. The connectors implement operations to manage listings on a particular ecommerce marketplace. The operations are defined in a standard ecommerce integration framework that is used by multiple connectors for particular ecommerce marketplaces. One or more of the operations implemented by the connectors are called from an enterprise resource planning system to manage one or more listings.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an ecommerce integration framework, but the technologies and techniques also serve other purposes in addition to these. In one implementation, one or more of the techniques described herein can be implemented as features within any type of program or service that manages ecommerce listings.

In one implementation, an ecommerce integration framework is provided for describing the data that is used in the process of listing items in ecommerce marketplaces. The term "item" as used herein is meant to include a product and/or service or the combination of products and/or services that are being offered by a company. The term "company" as used herein is meant to include an organization or an individual. The term "ecommerce marketplace" as used herein is meant to include a web site that allows for the goods and/or services to be listed and purchased by others. This web site could be a web site for just the company or a marketplace that brings together many companies' products. In another implementation, a mechanism is provided to synchronize this data with an enterprise resource planning (ERP) system. The term "enterprise resource planning system" as used herein is meant to include an application used by a company to manage its products and/or services that may be sold through various channels.

A common protocol is used for the exchange of data with ecommerce marketplaces. The data involved in this abstraction through the ecommerce integration framework can include product merchandising and inventory information, product catalog hierarchies, sales orders, customer payments, shipping information, tax information, and payment methods. These techniques will be described in further detail in FIGS. 1-5.

Figure 1:
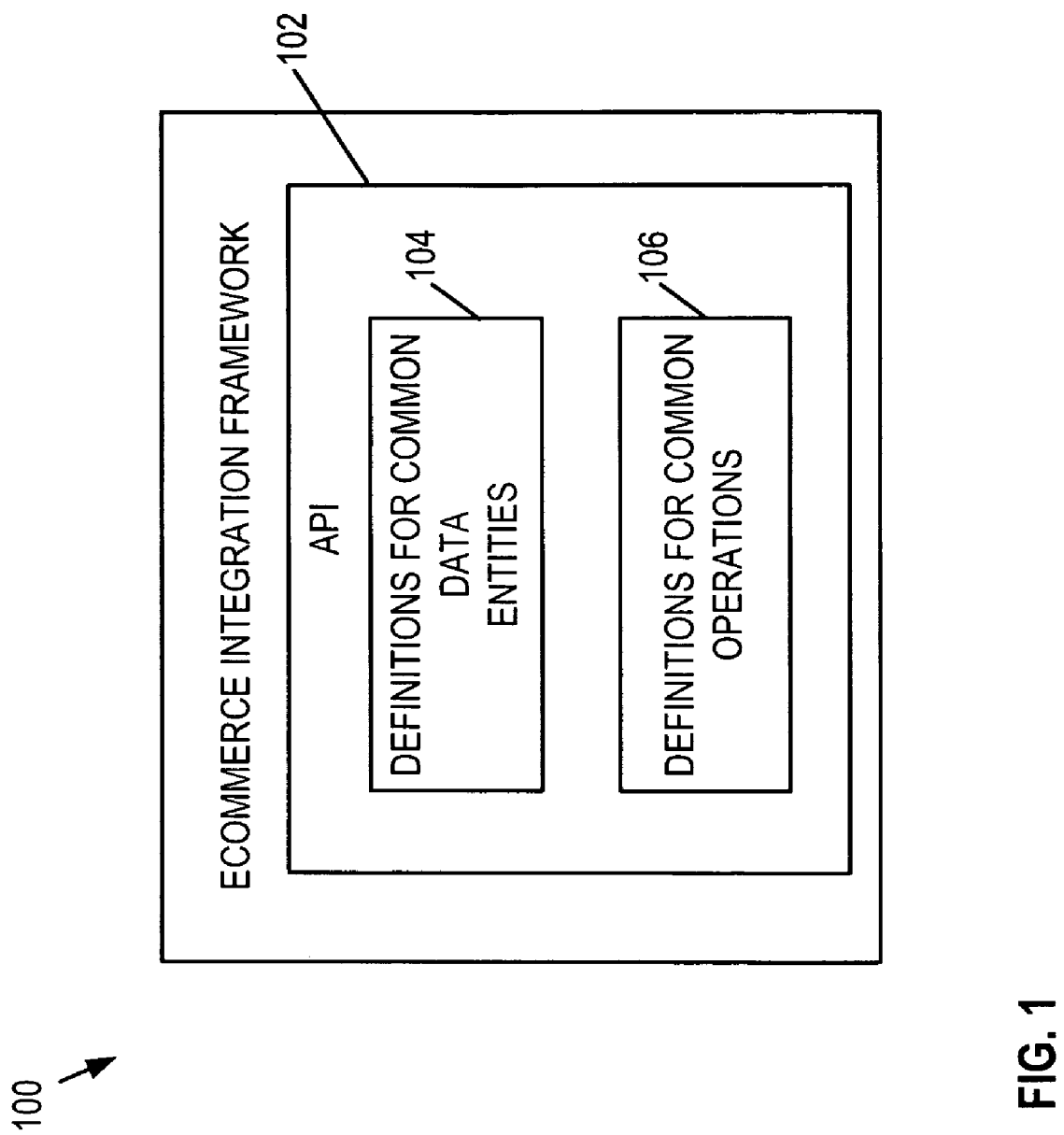
FIG. 1 is a diagrammatic view of an ecommerce integration framework.

FIG. 1 is a diagrammatic view of an ecommerce integration framework 100. Ecommerce integration framework 100 has definitions for common data entities 104 that are commonly used by multiple ecommerce marketplaces for listing items. Common data entities 104 can include item details for a company's items (products or services), item listing details for an ecommerce marketplace, sales order details, shipping options, tax information, and custom data, to name a few non-limiting examples. Definitions for common operations 106 that can manipulate the common data entities are also included.

As a few non-limiting examples, the common operations 106 can include a create operation for creating one or more of the common data entities, a read operation for reading data contained in one or more of the common data entities, an update operation for updating data contained in one or more of the common data entities, and/or a delete operation for deleting data contained in one or more of the common data entities. Alternatively or additionally, other types of common operations 106 can provide additional functionality, such as a publish operation that prepares an item (product or service) for listing in a particular one of the ecommerce marketplaces by determining what listing structure is needed by the particular ecommerce marketplace and then creating a mapping that translates data from the common data entities to the listing structure.

In one implementation, the definitions for the common data entities 104 and the definitions for the common operations 106 are exposed through an application programming interface 102. The application programming interface 102 uses the common data entities and the common operations to enable one or more ERP systems to exchange data in a standardized format with one or more of the ecommerce marketplaces. In one implementation, ecommerce integration framework 100 can enable synchronization to occur with ERP systems without the ERP system having knowledge of the differences between any particular ecommerce marketplace.

Turning now to FIGS. 2-5, the stages and techniques for implementing one or more implementations of ecommerce integration framework 100 are described in further detail. In some implementations, the processes of FIG. 2-5 are at least partially implemented in the operating logic of computing device 500 (of FIG. 6).

Figure 2:
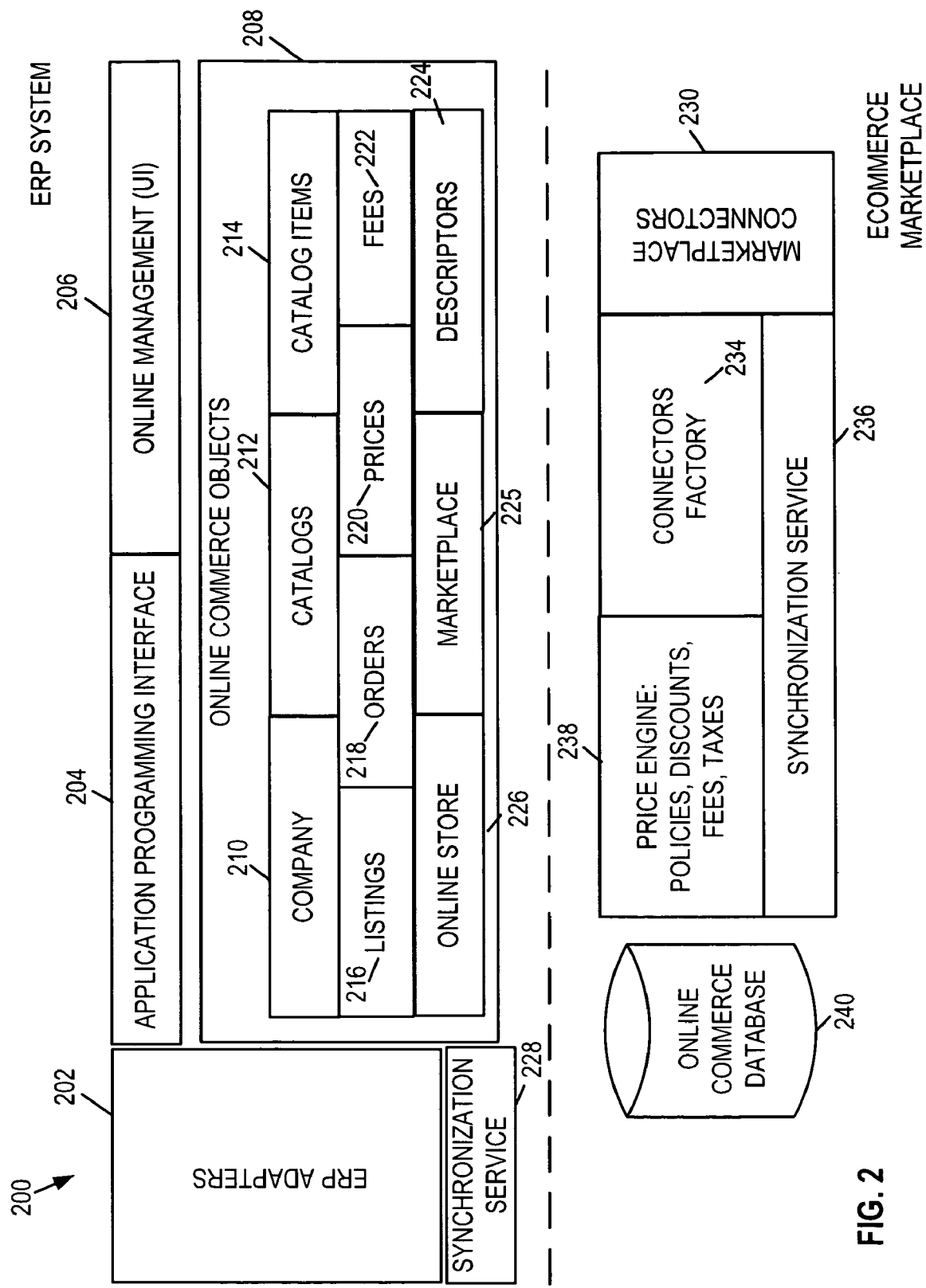
FIG. 2 is a diagrammatic view for one implementation illustrating an exemplary architecture for implementing the ecommerce integration framework illustrated on FIG. 1.

FIG. 2 is a diagrammatic view 200 for one implementation illustrating an exemplary architecture for implementing the ecommerce integration framework illustrated on FIG. 1. In other implementations, fewer or additional components could be used to implement ecommerce integration framework than those shown on FIG. 2. This exemplary architecture contains a variety of components which are contained in an ERP system and a variety of components which are contained in an ecommerce marketplace.

On the ERP system side, there are ERP adapters 202, a synchronization service 228, application programming interface 204, an online management user interface 206, as well as online commerce objects 208. ERP adapters 202 are responsible for translating ERP system entities to and from common data entities, synchronizing data (through synchronization service 228) between the ERP system and the ecommerce marketplace, and enhancing the user interface of the ERP system. ERP adapters can enhance the user interface of the ERP system by allowing management of the settings for communication with the ecommerce marketplace, the synchronization frequency and failure behavior, and the resolution of conflicts that occur during synchronization. Application programming interface 204 allows create, read, update, and delete operations to be performed on online commerce objects 208. In one implementation, application programming interface 204 allows online commerce objects 208 to be published to ecommerce marketplaces through marketplace connectors 230 and enable translation between different objects. Online management user interface 206 allows the company to view and manage catalogs and items in the catalog.

Online commerce objects 208 contain the details about the various items that that can be listed in one or more ecommerce marketplaces. These objects include a company object 210, catalogs object 212, catalog items object 214, listings object 216, orders object 218, prices object 220, fees object 222, descriptor object 224, marketplace object 225, and online store object 226. As described in further detail in FIGS. 3 and 4, catalogs object 212 and catalogs items object 214 can support the functionality of hierarchical catalogs and/or catalog items.

Descriptors object 224 allows ecommerce marketplaces and companies to define custom attributes required for listings on specific marketplaces. Descriptors include information about the data type, validation, rendering, and mappings to other entities. The listings object 216 includes standard listing attributes applicable to listings on any marketplace and descriptors objects 224 that are defined by and apply only to a specific marketplace. Listing attributes derive their values from catalog item attributes using a mapping defined by either the marketplace or the company.

Orders object 218 contains information about an order from an ecommerce marketplace, such as the items purchased, the shipping option selected, and taxes payable. Pricing object 220 contains pricing information, such as base sales prices, discounts by customer or by order contents, and promotions. The fees object 222 describes the fees charged by the ecommerce marketplace to the company for listing items or placing orders through their marketplace. Marketplace object 225 stores metadata about the ecommerce marketplace, such as the language used on the site, logos, and capabilities. Online store object 226 stores information about a company's account with an ecommerce marketplace, such as credentials, configuration, and usage statistics.

On the ecommerce marketplace side, there are various objects and/or components as well. These can include, for example, marketplace connectors 230, connectors factory object 234, synchronization service 236, price engine object 238, and an online commerce database 240. Marketplace connectors 230 contain the mappings that show how to translate from the format supported by the ecommerce marketplace to the format of the ecommerce integration framework that is supported by the ERP system. The marketplace connectors 230 would not be present on the ecommerce marketplace side in implementations when the ERP system is doing the mapping instead of the ecommerce system. In such implementations, there would be connectors on one or more servers of the ERP system, as opposed to one or more servers of the ecommerce marketplace. The connectors factory object 234 specifies which of the marketplace connectors 230 to use.

Price engine object 238 contains the various policies, discounts, fees, and taxes that are used in the ecommerce marketplace. The online commerce database 240 stores various details for the ecommerce marketplace, such as common data entities and a configuration of the marketplace connectors 230. Synchronization service 228 on the ERP system side and/or synchronization service 236 on the ecommerce marketplace side are responsible for synchronizing the data in one or more directions.

Figure 3:
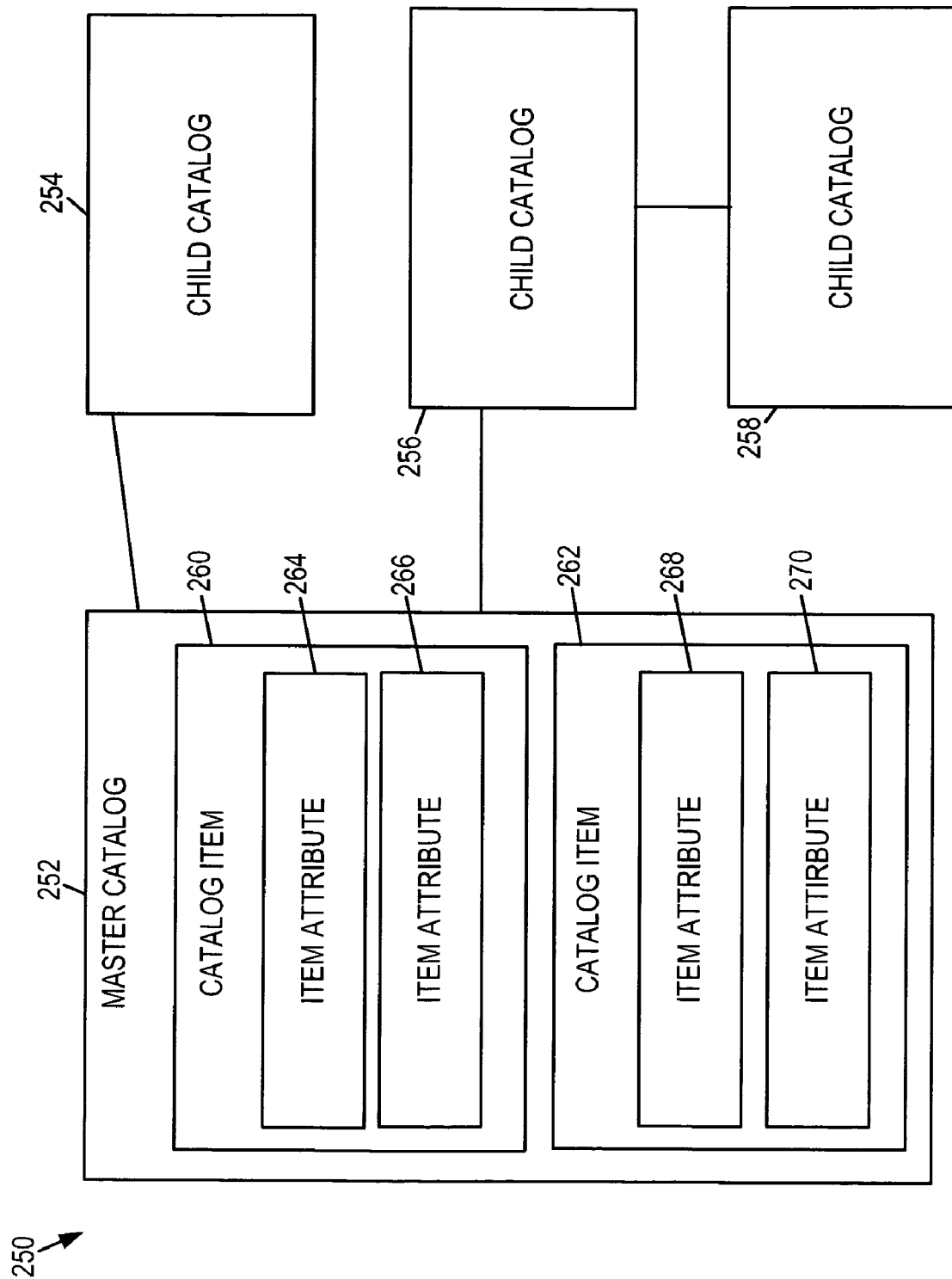
FIG. 3 is a diagrammatic view for one implementation illustrating a hierarchy of catalogs.

FIG. 3 is a diagrammatic view for one implementation illustrating a hierarchy of catalogs 250. Items can be arranged into hierarchical catalogs to enable companies to build flexible models for merchandising and pricing. A catalog item (such as 260 or 262) is an item representing an inventory item from the company's ERP system. Typically, these are products or services that the company wishes to sell. Catalog items have item attributes (such as 264, 266, 268, or 270). Item attributes are properties that describe the item, such as title, description, weight, and price. In one implementation, where one catalog is a child of another catalog, select item attributes can be overridden while other item attributes are inherited from a parent catalog.

Catalogs provide a way to create a collection of items and to customize the item attributes based upon the purpose of the catalog. In one implementation, all catalog items (such as 260 and 262) belong to a master catalog 252. The master catalog 252 is a logical container that contains all the catalog items.

The master catalog 252 can have child catalogs (such as 254, 256, and 258) that represent containers for a subset of the items from the master catalog 252. For example, the company could have a catalog named "Clearance Items" which holds items from the master catalog that the company is trying to sell quickly. The child catalog could contain links to items from the master catalog which it contains. Child catalogs can have child catalogs, such as child catalog 256 which is a parent of child catalog 258. In one implementation, the architecture will support this hierarchy to an arbitrary depth (i.e. with no theoretical limit) that allows users to structure their catalog hierarchy in a way that fits their workflow.

Figure 4:
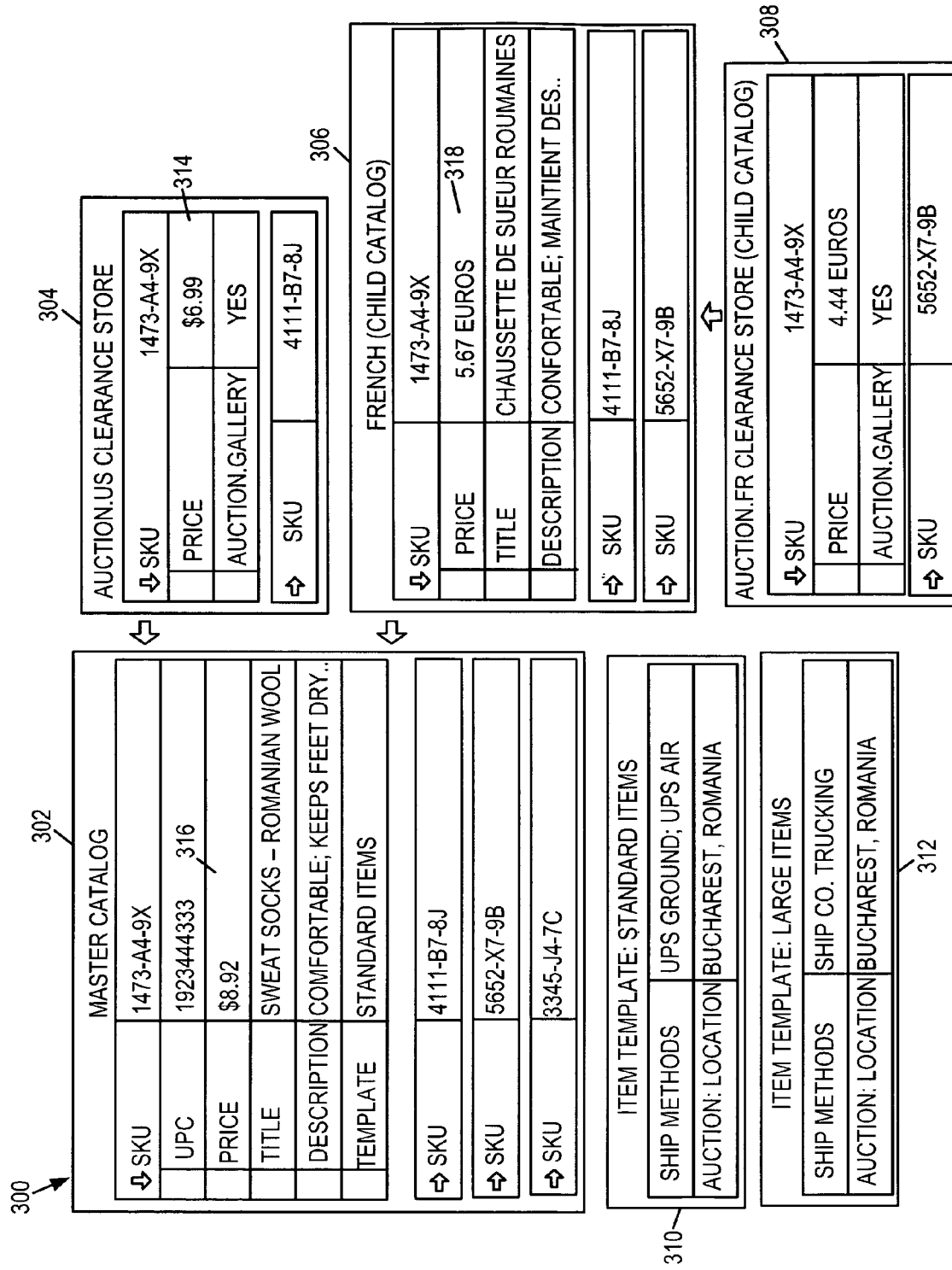
FIG. 4 is a diagrammatic view for one implementation illustrating an exemplary hierarchy of catalogs to customize the catalogs for different stores and languages.

Item attributes can be specialized (overridden) at the child catalog level, as shown in further detail in FIG. 4. This allows, for example, creating a child catalog that contains items with French descriptions. Another non-limiting example would be a child catalog to contain items with special descriptions for those items (products or services) that will be sold on a particular marketplace. These are just a few non-limiting examples of the ways the hierarchical structure can be used with catalogs. Numerous other hierarchical arrangements could be used in other implementations.

In one implementation, items in a child catalog are references, not copies. This means that the value of any attributes not specifically overridden in the child catalog is inherited from the parent, or the parent's parent, etc. Thus, if an attribute is changed at the parent level and the child has not overridden that attribute, the value for that attribute when evaluated at the child level will be the value at the parent level. This feature allows the company to make a correction or an update at the most general level and not have to repeatedly make this change for all the child items.

In another implementation, if any attribute is overridden (such as an attribute in child catalog 254), then no data values are inherited from the parent catalog (such as master catalog 252). In other words, once at least one attribute in a child catalog is overridden, then all of the attributes specified in the child catalog will override the attributes in the parent catalog.

In yet another implementation, attributes can be structured into attribute groups. In such an implementation, if any attribute in an attribute group in a child catalog (such as child catalog 254) is overridden, then no data values are inherited from the parent catalog (such as master catalog 252) for the attributes in that attribute group. In other words, if at least one attribute in an attribute group in a child catalog is overridden, then all of the attributes in that attribute group for the child catalog will override those attributes in the parent catalog.

FIG. 4 is a diagrammatic view for one implementation illustrating an exemplary hierarchy of catalogs 300 which customizes the catalogs for different stores and languages. In the example shown in FIG. 4, the company has chosen to first build a hierarchy based on language. The descriptive attributes (like Title and Description) are then overridden in some of the child catalogs that are non-English, such as French child catalog 306. This allows there to be a French language version of the product in addition to the English language version that is defined in the master catalog 302.

At the next level in the catalog hierarchy, the company has chosen to specialize by store. This example shows a catalog for a US clearance store (child catalog 304), a French auction store (French child catalog 306), etc. At this level, attributes are specified that vary by store, such as price 314 or price 318. French child catalog 306 also has a child catalog, which is a French auction clearance store 308. The French auction clearance store 308 overrides certain attributes of the French child catalog 306 from which it derives. It will be appreciated that the hierarchical catalogs and item attributes shown in FIG. 4 are just exemplary to illustrate the concept in more detail, and that numerous types of catalog hierarchies, items, and item attributes could be used in other implementations.

Figure 5:
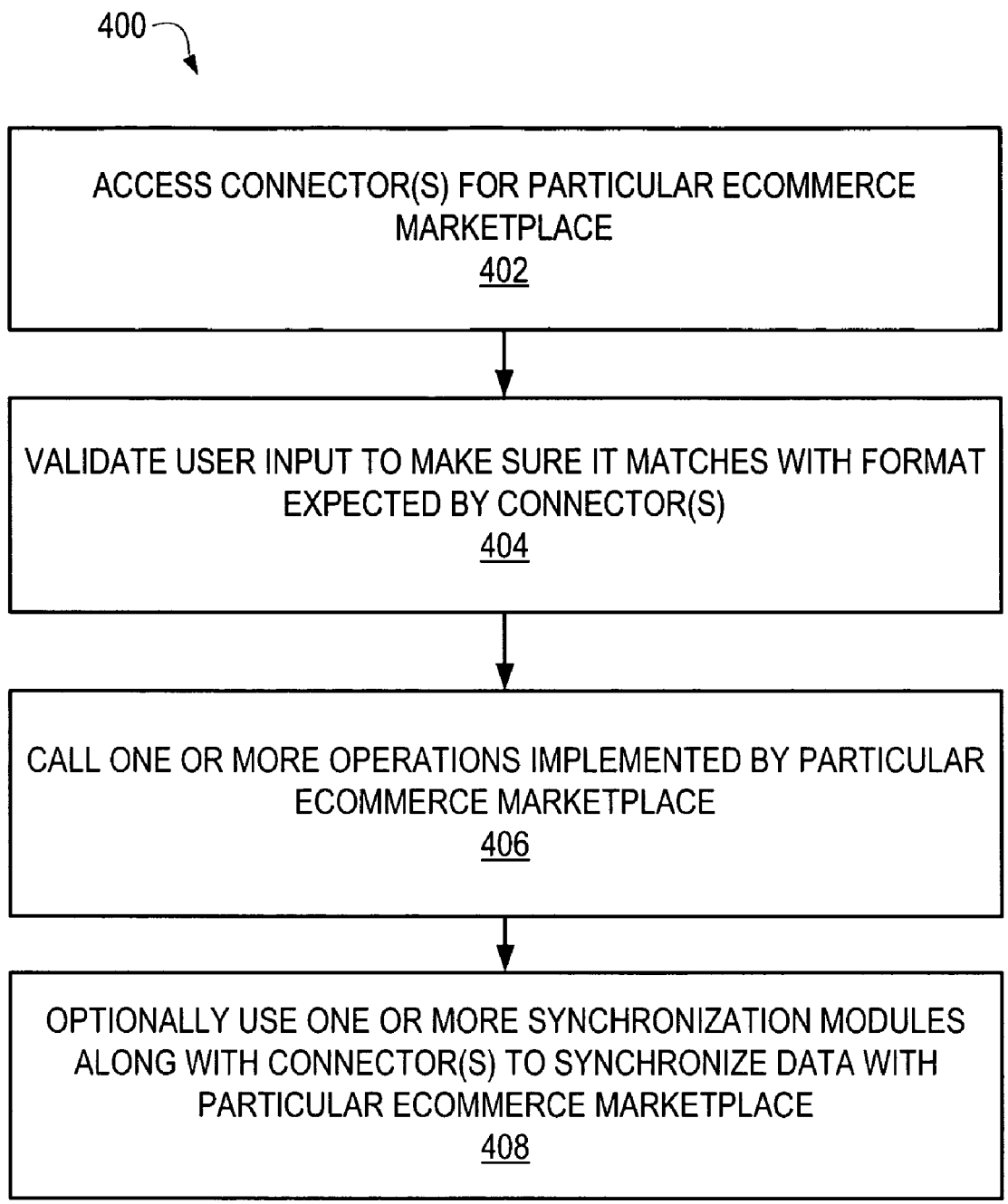
FIG. 5 is a process flow diagram that illustrates one implementation of the stages involved in communicating with a particular ecommerce marketplace using a standard ecommerce integration framework.

FIG. 5 is a process flow diagram 400 that illustrates one implementation of the stages involved in communicating with a particular ecommerce marketplace using an ecommerce integration framework. One or more connectors are accessed for a particular ecommerce marketplace (stage 402). In one implementation, the connectors are contained on an ecommerce marketplace and are exposed through an API to an ERP system. In another implementation, the connectors for the particular ecommerce marketplace are stored in the ERP system itself. The connectors specify what operations are implemented by or on behalf of the particular ecommerce marketplace for managing item listings. The operations are defined in a standard ecommerce integration framework that is used by multiple of ecommerce marketplaces.

User input, such as the listing information that was previously entered by the company, can optionally be validated to make sure it matches with the format expected by the connector(s) (stage 404). In such a scenario, the connector can declare what format it expects through the use of custom attribute descriptors on the listing object, and this declared format would be validated before the connector was even invoked.

One or more of the operations implemented by the particular ecommerce marketplace are called from an enterprise resource planning system to manage one or more item listings (stage 406). In other words, the ERP system makes a call to the operation(s) over the Internet or another network connection to invoke the functionality offered by those operations. This can include adding, updating, deleting, and/or viewing data residing in the particular ecommerce marketplace related to that company's items that are listed for sale in that ecommerce marketplace.

In one implementation, one or more synchronization modules are used periodically along with the connector(s) to synchronize the data between the ERP system and the particular ecommerce marketplace (stage 408). The synchronization modules can be contained on the ERP system and/or the particular ecommerce marketplace to synchronize data in either direction so that the items for that particular company are updated on a periodic basis in both systems.

Figure 6:
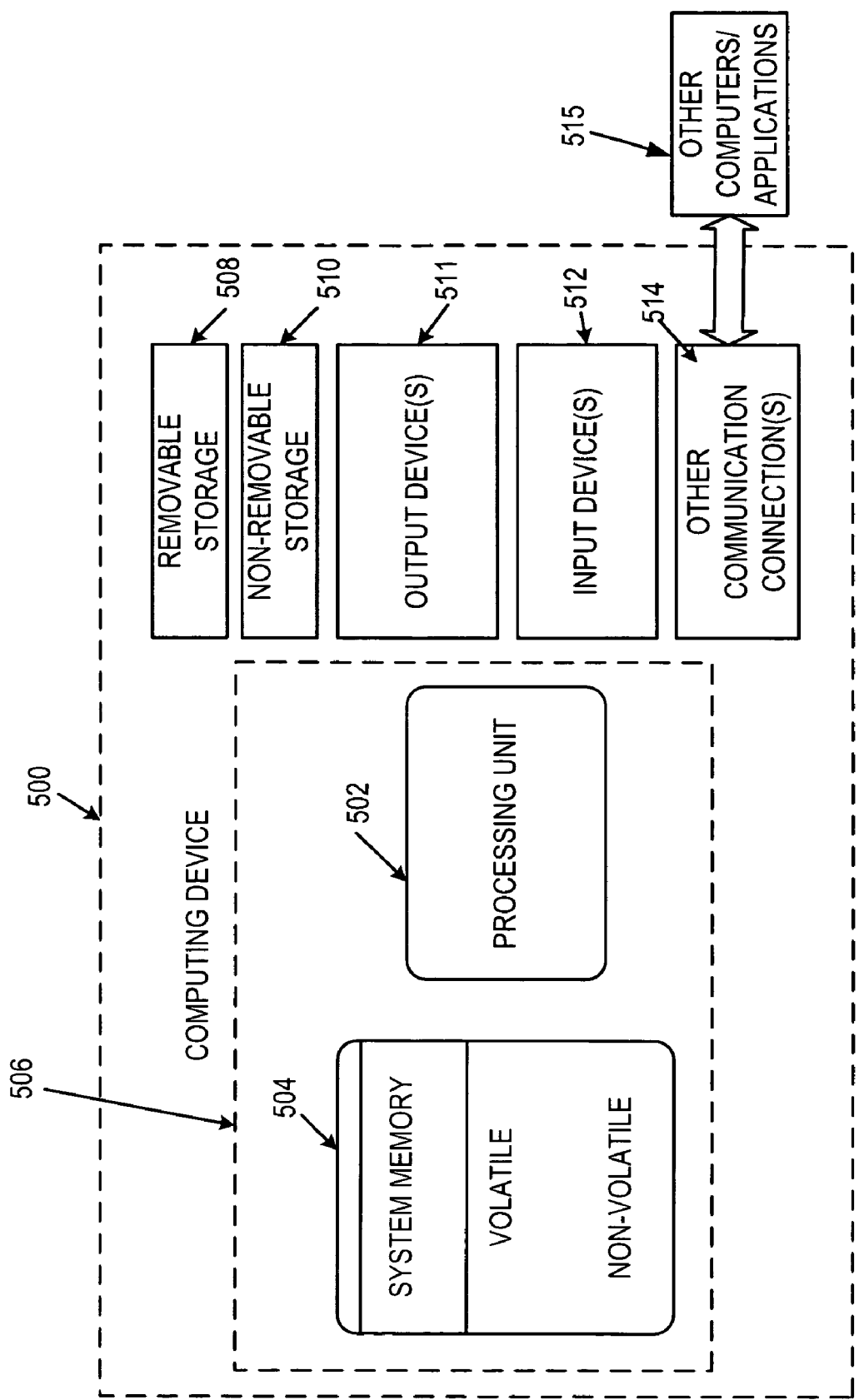
FIG. 6 is a diagrammatic view of a computer system of one implementation.

As shown in FIG. 6, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 6 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 6 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. An ecommerce integration framework comprising:
    definitions for a plurality of common data entities that are commonly used by a plurality of distinct ecommerce marketplaces for listing items;
    definitions for a plurality of common operations that can manipulate the common data entities; and
    an application programming interface that uses the common data entities and the common operations to enable one or more enterprise resource planning systems to exchange data in a standardized format with two or more distinct ecommerce marketplaces; and
    adapters that translate enterprise resource planning system entities to and from common data entities used by the two or more distinct ecommerce marketplaces and that synchronize data between the enterprise resource planning system and each of the two or more distinct ecommerce marketplaces.

2. The ecommerce integration framework of claim 1, wherein one of the common data entities contains item details.

3. The ecommerce integration framework of claim 1, wherein at least one of the common data entities contains listing details.

4. The ecommerce integration framework of claim 1, wherein at least one of the common data entities contains sales order details.

5. The ecommerce integration framework of claim 1, wherein at least one of the common data entities contains shipping options.

6. The ecommerce integration framework of claim 1, wherein at least one of the common data entities contains tax information.

7. The ecommerce integration framework of claim 1, wherein at least one of the common operations includes a create operation for creating one or more of the common data entities.

8. The ecommerce integration framework of claim 1, wherein at least one of the common operations includes a read operation for reading data contained in one or more of the common data entities.

9. The ecommerce integration framework of claim 1, wherein at least one of the common operations includes an update operation for updating data contained in one or more of the common data entities.

10. The ecommerce integration framework of claim 1, wherein at least one of the common operations includes a delete operation for deleting data contained in one or more of the common data entities.

11. The ecommerce integration framework of claim 1, wherein at least one of the common operations includes a publish operation that prepares an item for listing in a particular one of the ecommerce marketplaces by determining what listing structure is needed by the particular one of the ecommerce marketplaces to list the item, and then creates a mapping that translates data from the common data entities to the listing structure.

12. The ecommerce integration framework of claim 1, wherein the enterprise resource planning system accesses connectors that specify which operations are implemented by or on behalf of each of the two or more distinct ecommerce marketplaces for managing listing items.

13. A computer-readable medium having computer-executable instructions for causing a computer to perform steps comprising:
    creating and managing catalogs of items to be sold in one or more ecommerce marketplaces using a customizable structure, wherein the customizable structure enables the catalogs to be created in a hierarchical manner with at least one parent catalog and zero or more child catalogs, and where data values specified in a respective child catalog will override data values specified in the parent catalog.

14. The computer-readable medium of claim 13, wherein any data values not specifically overridden in the respective child catalog are inherited from the parent catalog.

15. The computer-readable medium of claim 13, wherein when at least one data value is overridden in the respective catalog, no data values are inherited from the parent catalog.

16. The computer-readable medium of claim 13, wherein at least one data value is overridden in the respective catalog, and the at least one data value is part of an attribute group, then no data values are inherited from the parent catalog for that attribute group.

17. A method for communicating with two or more ecommerce marketplaces using an ecommerce integration framework, the method comprising:
    for each of the two or more ecommerce marketplaces, accessing one or more connectors for that ecommerce marketplace, the connectors specifying a plurality of operations implemented for that ecommerce marketplace for managing item listings, the plurality of operations being defined in a standard ecommerce integration framework that is used by a plurality of ecommerce marketplaces;
    for each of the two or more ecommerce marketplaces, calling one or more of the operations implemented by that ecommerce marketplace from an enterprise resource planning system to manage one or more item listings;
    translating enterprise resource planning system entities to and from common data entities used by the plurality of distinct ecommerce marketplaces for listing items; and
    for each ecommerce marketplace, synchronizing data between the enterprise resource planning system and that ecommerce marketplace using one or more of the connectors.

18. The method of claim 17, wherein the one or more connectors for an ecommerce marketplace reside on a server of that ecommerce marketplace.

19. The method of claim 17, wherein the one or more connectors reside on a server of the enterprise resource planning system.

20. The method of claim 17, wherein the item listings are represented in a hierarchical manner on the enterprise resource planning system and wherein a sub-set of the item listings are specifically for the particular ecommerce marketplace.

* * * * *